United States Patent [19]

Dunnavant et al.

[11] 4,374,229

[45] Feb. 15, 1983

[54] THERMOSETTING RESINOUS MOLDING COMPOSITIONS

[75] Inventors: William R. Dunnavant; Richard E. Field, both of Columbus; Dan Borgnaes, Westerville, all of Ohio

[73] Assignee: Ashland Oil, Inc., Ashland, Ky.

[21] Appl. No.: 320,282

[22] Filed: Nov. 12, 1981

Related U.S. Application Data

[63] Continuation-in-part of Ser. No. 130,954, Mar. 17, 1980, abandoned, which is a continuation of Ser. No. 16,718, Mar. 1, 1979, abandoned.

[51] Int. Cl.³ ............................................. C08L 75/06
[52] U.S. Cl. ..................................... 525/28; 525/440; 525/455; 525/920; 528/73
[58] Field of Search ................ 525/28, 440, 455, 920; 528/73

[56] References Cited

U.S. PATENT DOCUMENTS

| | | | |
|---|---|---|---|
| 3,509,234 | 4/1970 | Burlant | 260/859 R |
| 3,677,920 | 7/1972 | Kai | 260/859 R |
| 3,772,404 | 11/1973 | Knight | 260/859 R |
| 3,876,726 | 4/1975 | Ford | 260/859 R |
| 3,907,751 | 9/1975 | Knight | 260/859 R |
| 3,954,714 | 5/1976 | Kuehn | 260/859 R |
| 3,975,457 | 8/1976 | Chang | 260/859 R |
| 4,065,587 | 12/1977 | Hwa | 260/859 R |
| 4,082,634 | 4/1978 | Chang | 260/859 R |
| 4,213,837 | 7/1980 | Bristowe | 525/455 |

FOREIGN PATENT DOCUMENTS 48-01411 1/1973 Japan .
53-14795 2/1978 Japan .
54-21488 2/1979 Japan .

*Primary Examiner*—Paul Lieberman
*Attorney, Agent, or Firm*—William Kammerer

[57] ABSTRACT

A thermosetting resinous composition characterized in constituting at least two oligomeric polyester segments terminally joined through a polyurethane residue and having end groups containing polymerizable unsaturation. Further disclosed are the thermoset products obtained by the addition polymerization of the aforesaid compositions in the presence or absence of a copolymerizable monomeric crosslinking agent. The resultant thermoset products are particularly useful in preparing molded articles.

11 Claims, No Drawings

THERMOSETTING RESINOUS MOLDING COMPOSITIONS

CROSS REFERENCE TO RELATED APPLICATIONS

This is a continuation-in-part of application Ser. No. 130,954 filed Mar. 17, 1980, which in turn is a continuation of application Ser. No. 016,718 filed Mar. 1, 1979, both now abandoned.

BACKGROUND OF THE INVENTION

1. Field of the Invention

This invention relates to polymerizable resinous condensates and the thermosetting products thereof.

2. Description of the Prior Art

Polyester resins, as such are understood in the relevant art, include the class of oligomeric polyesterification products prepared by reacting a dicarboxylic acid or a diacid anhydride with a dihydric alcohol. Polyester resins having polymerizable unsaturation provided by employing an $\alpha,\beta$-ethylenically unsaturated dicarboxylic acid as all or part of the diacid component when crosslinked with a vinyl monomer, yield thermoset resinous compositions having widespread utility in the laminating, molding and related arts. Particular applications of the aforesaid thermoset products importantly include their use in the fabrication of automobile body parts, boat hulls and the like structural elements. While these products exhibit overall an exceptionally good balance of chemical and physical properties, their impact resistance and dimensional stability could desirably stand improvement.

It is known that a class of oligomeric condensates containing terminal acrylic groups, commonly referred to as "vinyl esters", can be converted to thermoset products having superior impact resistance. The vinyl esters are obtained by reacting an acrylic acid with the conventional epoxy resins thereby providing an acrylic acid capped oligomeric polyetherification condensate. It is not practical, however, to cap a hydroxyl terminated polyester in a similar manner inasmuch as the esterification reaction involved requires the use of elevated temperatures which preferentially promote the polymerization of the indicated vinyl acid.

Yet another area of prior art investigation directed to improving the properties of the thermoset products derived from unsaturated polyester resins has centered on the incorporation of urethane residues or linkages in the polyester backbone. Application of this technology, however, has been essentially confined to the surface coating field rather than in the area concerned with molded compositions.

OBJECT OF THE INVENTION

An object of this invention is to provide moldable reactive acrylic resins based on oligomeric polyesters which are structurally linked through a urethane residue.

SUMMARY OF THE INVENTION

In accordance with the present invention there is provided a class of thermosetting resinous compositions especially designed for producing filled or unfilled thermoset molded structures. The contemplated compositions structurally comprise at least two oligomeric polyester segments containing internal ethylenic unsaturation terminally joined to one another through polyurethane linkages. Further characterizing such compositions is that each of said polyester segments possesses a functional end group containing vinyl unsaturation. While the foregoing compositions can in themselves be polymerized to form a thermoset product, a further important aspect of the invention is directed to copolymerizing such compositions with a vinyl or polyallyl crosslinking agent to provide like substantially insoluble and infusible products.

DESCRIPTION OF PREFERRED EMBODIMENTS

The basic resinous structure for use in the practice of this invention is in the form of a linear oligomeric polyester backbone terminated at one end with a hydroxy group and at the other end with a vinyl group. These products, trivially called esterols, can conveniently be prepared by the catalytically induced addition or condensation of a lower alkylene oxide with a dicarboxylic acid anhydride in a presence of a mono-carboxylic acid containing the indicated type of unsaturation whereby the active hydrogen atom serves to initiate the addition reaction. The contemplated initiators in the context of the present invention include methacrylic acid and acrylic acid.

The initiator, beyond serving to supply a terminal group containing said polymerizable unsaturation, also solely governs the ultimate molecular weight of the esterol. In this respect an applicable calculated molecular weight range is from 200 to 800 and more preferably from about 300 to 500. The average theoretical molecular weight of the resultant oligomer is determined by dividing the total weight of reactants by the mols of initiator utilized in terms of a common weight dimension. The respective anhydride reactants are combined in an approximate stochiometric relationship, keeping in mind that an appropriate excess of the alkylene oxide is to be used in order to obtain the contemplated esterol. Further details with regard to the resinification reaction involved can be found in U.S. Pat. No. 3,732,390. While the indicated patented process is directed to a continuous process for producing such polyesters, one can refer to the plurality of references cited therein for particulars concerning batch operations if such type of processing is preferred.

In deriving the aforementioned esterols, any of the $C_2$-$C_4$ alkylene oxides or mixtures thereof can be used. Propylene oxide, however, represents the preferred reactant. Maleic anhydride is used exclusively or as a major portion of the diacid anhydride component. A variety of other dibasic acid anhydrides can be used in combination with the maleic anhydride in the practice of such an embodiment. Representative of the former anhydrides include phthalic, succinic, chlorendic, itaconic as well as substituted derivatives thereof.

As indicated above, maleic anhydride is used exclusively or as a major portion of the diacid anhydride component in the formulation of the esterol. In either case, however, the maleic residues of the resultant esterol are substantially completely isomerized to fumarate residues. This can be readily accomplished in the presence of an isomerization catalyst at temperatures which do not adversely affect the terminal acrylic group provided the esterol does not exhibit an acid value in excess of about 3 and more preferably not in excess of 1. Applicable isomerization catalysts include a variety of secondary monoamines of which morpholine represents the catalyst of choice. Observing the preferred conditions noted, the maleate residues can be substantially completely isomerized in less than 30 minutes at a temperature in the order of from 60°–80° C.

Generally it is desirable to effect coupling of the esterol with a polyisocyanate prior to copolymerizing with the crosslinking agent. A notable exception to this sequence, however, is observed in the important use of the contemplated compositions in a reaction injection molding (RIM) application, all as will be described more fully hereinbelow. The coupling reaction is carried out at a temperature between about 40° and 90° C. in a suitable organic solvent for the indicated reactants. Likewise, a crosslinking agent, e.g., styrene, when employed in practicing the invention can serve as the solvent. The polyisocyanate and esterol are combined in the coupling reaction to provide an NCO/OH equivalent ratio value of from 0.8–1.2, and more preferably in the ratio of about 1:1 respectively on the same basis. A variety of aromatic and aliphatic polyisocyanates are suitable for this purpose including such as toluene diisocyanate, methylene-4,4'-diphenyldiisocyanate, hexamethylene-1, 6-diisocyanate, 3-isocyanatomethyl-3, 5,5-trimethylcyclohexyl isocyanate, and the like. Isonate 143L (Upjohn), a proprietary diisocyanate type product having an average of about 2.2 isocyanate groups per molecule represents a particularly preferred polyisocyanate for the purposes herein.

Suitable crosslinking agents for the purposes discussed above include a variety of vinyl and polyallyl monomers. Representative monomers are such as styrene, vinyl toluene, methyl acrylate, methyl methacrylate, vinyl acetate, vinyl chloride, divinylbenzene, diallyl phthalate and isophthalate, triallylcyanurate, α-methylstyrene, tert-butyl styrene, tri-allyl isocyanurate, ethylene glycol diacrylate and the like. The ratio of the coupled esterol to the monomeric crosslinking agent can be varied widely over the range of from 99–20 parts by weight of the former and correspondingly from 1–80 parts of the crosslinking agent. Conventional initiators and promoters are applicable in effecting the copolymerization reaction.

As previously indicated, the coupled esterol compositions of this invention are especially amenable for use in deriving thermoset molded products in accordance with a RIM type operation. For this purpose it is preferred to derive the resultant thermoset product by crosslinking the coupled esterol in the general manner hereinbelow described.

In practice, the operation involves the generation of two reactive streams. In one stream the esterol is combined with a suitable catalyst, e.g., a tin salt and optionally but preferably with an amine promoter. In the other stream, the polyisocyanate is combined with a suitable crosslinking agent in the presence of a free radical catalyst. The two streams are admixed to provide a instantaneously reactable system which is immediately pump-injected into a mold where the completion of the reaction is evidenced by a peak exotherm occurring within several minutes, whereupon the molded object is discharged from the mold.

In order to acquaint those skilled in the art more fully with the manner contemplated for carrying out the present invention, the following illustrative working examples are set forth. All parts given are parts by weight.

EXAMPLE I

Into a suitable resin reaction vessel were charged 374 parts maleic anhydride (MA), 181 parts of methacrylic acid (MAA), 0.55 parts of hydroquinone and 1.60 parts magnesium hydroxide. The reactor was evacuated to 0.2 atmosphere and dry nitrogen bled in to one atmosphere. With agitation, the reactor contents were heated to 60° C., whereupon 497 parts of propylene oxide (PO) were added at a rate so that the temperature was maintained constant at about 120° C. Upon completion of the propylene oxide addition, heating was continued at the indicated temperature until an acid value of about 0.5 was attained. The resultant product exhibited a hydroxyl value of 112, a Gardner color of 5 and a nil fumarate content.

To the reactor contents were added 10.5 parts of morpholine and with agitation heated to 80° C. and held for about 20 minutes. Analysis of resultant product indicated that in excess of 95% of the starting maleate residues were isomerized to fumarate residues.

EXAMPLE II

This example serves to illustrate the procedure for coupling the esterol of Example I.

To a suitable reaction vessel were charged 525 parts of the esterol of Example I, 205 parts of dry toluene and 91.4 parts of toluene diisocyanate. With agitation the reaction mixture was heated to 60° C. and held for about 6 hours at which time the isocyanate value was reduced to almost nil. The toluene was then removed under vacuum, leaving a thick liquid at room temperature.

EXAMPLE III

The purpose of this example is primarily to illustrate the physical properties associated with a variety of thermoset molded products provided in the practice of the present invention employing the coupled esterol of Example II. Test specimen were prepared in a conventional manner for use in the applicable ASTM testing procedure. In each instance curing of the test specimen was effected in the presence of a suitable amount of a conventional free radical initiator for progressive periods at an elevated temperature with the final cure temperature being in the order of about 120° C. Heating at the indicated maximum temperature was carried out until the test material exhibited a constant Barcol hardness. Details with respect of composition of the various test products together with the data obtained therefrom in accordance with standard ASTM testing procedures are set forth in the following Table I.

TABLE I

| Test No. | Comonomer Type | Wt % | Heat Distortion[4] °C. | Tensile Strength[5] psi | Tensile[5] Modul. × 10−5 psi | % Tensile[5] Elong. | Flexural[6] Strength psi | Flex. Mod.[6] × 10−5 psi | Barcol Hardness |
|---|---|---|---|---|---|---|---|---|---|
| 1 | — | — | 69 | 8,700 | 5.62 | 1.81 | 20,300 | 5.45 | 36 |
| 2 | Styrene | 40 | 140 | 2,900 | 4.31 | 0.73 | 10,000 | 4.70 | 41 |
| 3 | TAC[1] | 5 | 139 | 3,200 | 5.90 | 0.57 | 18,800 | 5.83 | 50 |
| 4 | DAP[2] | 5 | 157 | 6,300 | 5.73 | 1.22 | 16,800 | 5.63 | 50 |
| 5 | DAP[2] | 10 | 161 | 4,500 | 6.15 | 0.81 | 17,600 | 5.76 | 52 |

TABLE I-continued

| Test No. | Comonomer Type | Wt % | Heat Distortion[4] °C. | Tensile Strength[5] psi | Tensile[5] Modul. × 10−5 psi | % Tensile[5] Elong. | Flexural[6] Strength psi | Flex. Mod.[6] × 10−5 psi | Barcol Hardness |
|---|---|---|---|---|---|---|---|---|---|
| 6 | DAP[2] | 25 | 199 | 2,000 | 6.34 | 0.36 | 7,000 | 5.99 | 54 |

TAC[1] - Triallyl cyanurate
DAP[2] - Diallyl o-phthalate
[4]ASTM D-648
[5]ASTM D-638
[6]ASTM D-790

EXAMPLE IV

This example is illustrative of the manner the present invention can be implemented in preparing molded structures by the RIM technique. Two reactive streams each exhibiting at least two weeks stability at 90° F. are prepared in accordance with the formulations noted below. The esterol component of Stream #1 is the product of Example I.

| STREAM #1 | | STREAM #2 | |
|---|---|---|---|
| Component | Parts | Component | Parts |
| Esterol | 100 | Toluene diisocyanate | 18.5 |
| Dibutyltindilaurate | 0.85 | Diallyl-o-phthalate | 13.5 |
| Dimethylaniline | 0.25 | VAZO 64 | 0.85 |
| | | Benzoyl Peroxide | 0.15 |

Upon combining the two streams at room temperature in the ratio of 3 parts of Stream #1 and 1 part of Stream #2 in an appropriately designed molding equipment for this type of operation, an immediate resinification reaction ensues with a peak exotherm of 120° C. occurring within three minutes. The streams can be combined in the presence or absence of the usual fillers. A blowing agent such as methylene chloride may also be added to improve surface properties.

We claim:

1. A thermosetting resinous composition comprising an organic polyisocyanate coupled oligomeric polyester having a calculated molecular weight of from 200 to 800 terminated at one end with a hydroxy group and at the other end with a vinyl group and wherein the polyisocyanate and polyester are combined in the coupling reaction to provide an NCO/OH equivalent ratio value of from 0.8–1.2, said polyester prepared by the catalytically induced addition reaction of a dicarboxylic acid anhydride selected from the group consisting of maleic anhydride and a mixture of maleic anhydride and phthalic anhydride in which maleic anhydride constitutes the major proportion thereof with a lower alkylene oxide in the presence of methacrylic acid or acrylic acid as the initiator and wherein the maleate residues of said polyester are substantially completely isomerized to corresponding fumarate residues.

2. The thermosetting resinous composition according to claim 1 wherein the polyisocyanate and polyester are combined in the coupling reaction to provide an NCO/OH equivalent ratio of about 1:1, respectively.

3. The thermosetting resinous composition according to claim 2 wherein said initiator is methacrylic acid and said polyester having a calculated molecular weight of from about 300–500.

4. The thermosetting resinous composition according to claim 2 wherein said initiator is acrylic acid and said polyester having a calculated molecular weight of from about 300–500.

5. The thermosetting resinous composition according to claim 3 or 4 wherein said lower alkylene oxide is propylene oxide.

6. The thermosetting resinous composition according to claim 5 wherein the dicarboxylic acid anhydride is maleic anhydride.

7. The thermosetting resinous composition according to claim 6 wherein said polyisocyanate is a diisocyanate.

8. The thermosetting resinous composition according to claim 7 wherein said diisocyanate is an aromatic diisocyanate.

9. The thermosetting resinous composition according to claim 7 wherein said aromatic diisocyanate is toluene diisocyanate or methylene diphenyl diisocyanate.

10. A thermoset resinous composition comprising the catalyzed co-reaction product of from 99–20 parts by weight of the coupled oligomeric polyester of claim 5 and correspondingly from 1–80 parts by weight of a monomeric cross-linking agent containing at least one vinyl group or at least two allyl groups.

11. The thermoset resinous composition in accordance with claim 10 wherein said monomeric cross-linking agent is styrene.

* * * * *